March 26, 1929. H. G. STAMPER 1,707,149
STAMPING MACHINE
Filed Nov. 29, 1927 3 Sheets-Sheet 1
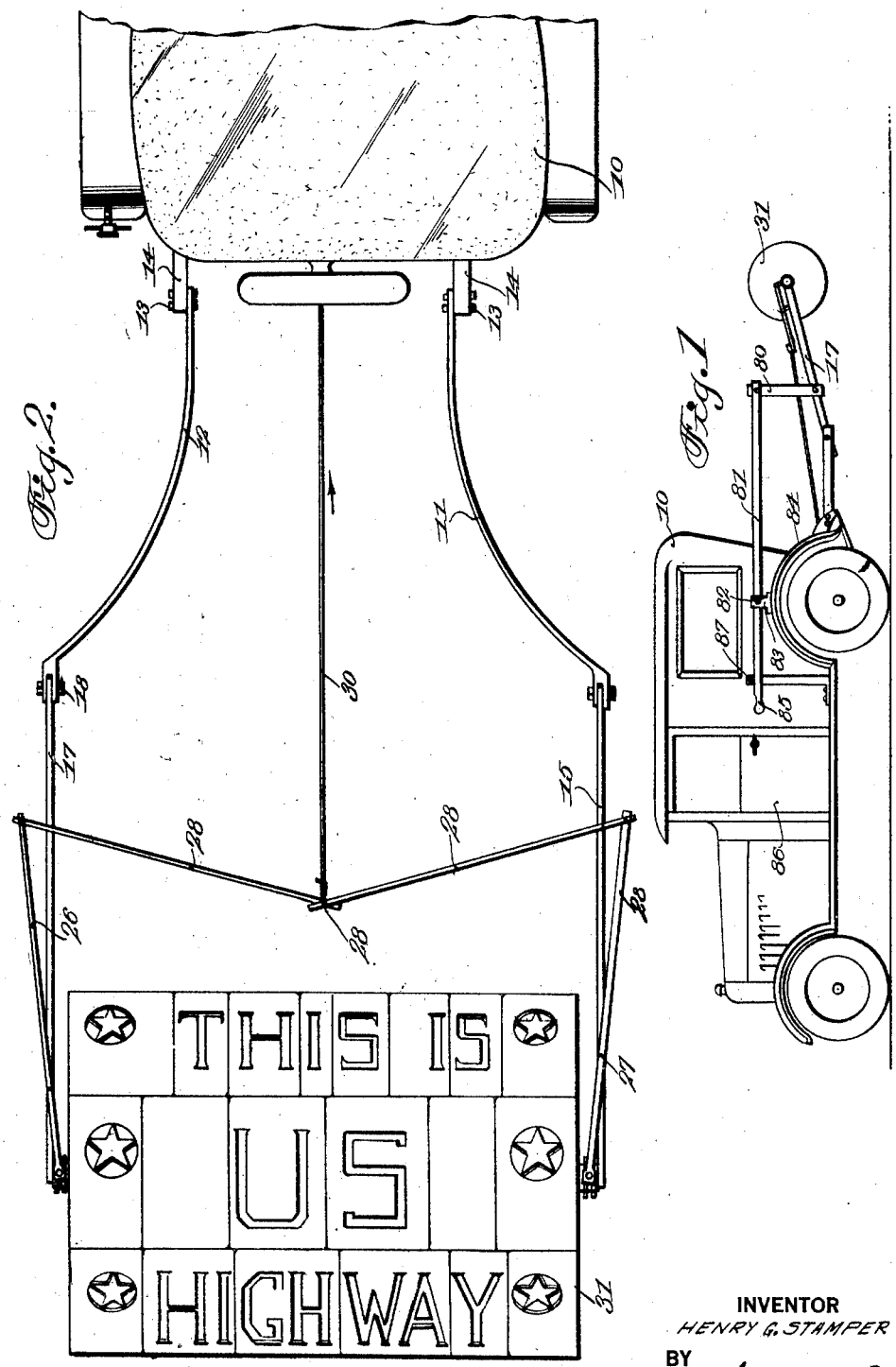
INVENTOR
HENRY G. STAMPER
BY
ATTORNEY March 26, 1929. H. G. STAMPER 1,707,149
STAMPING MACHINE
Filed Nov. 29, 1927  3 Sheets-Sheet 2
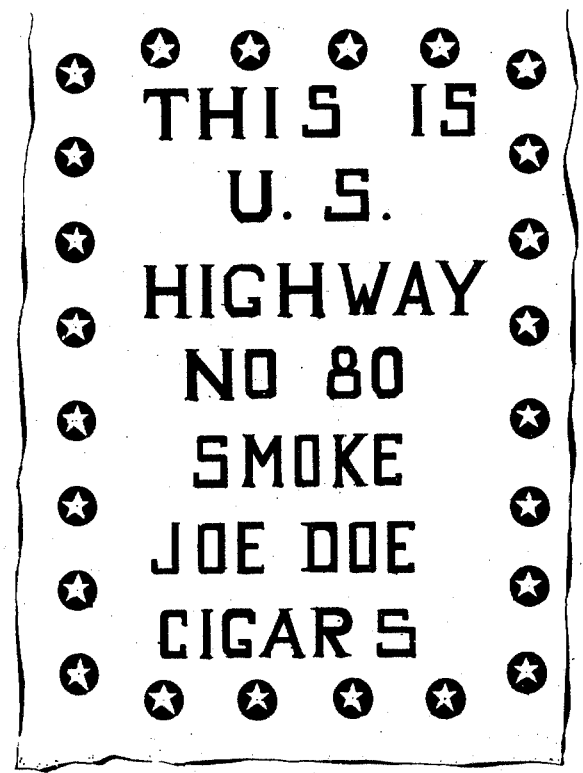
Fig. 3.
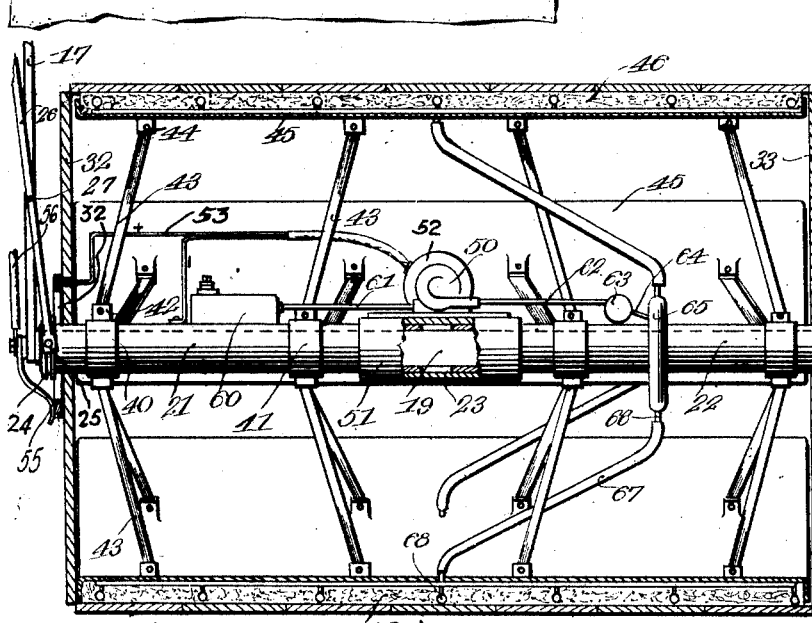
Fig. 4.
Fig. 8.
INVENTOR
HENRY G. STAMPER
BY
ATTORNEY

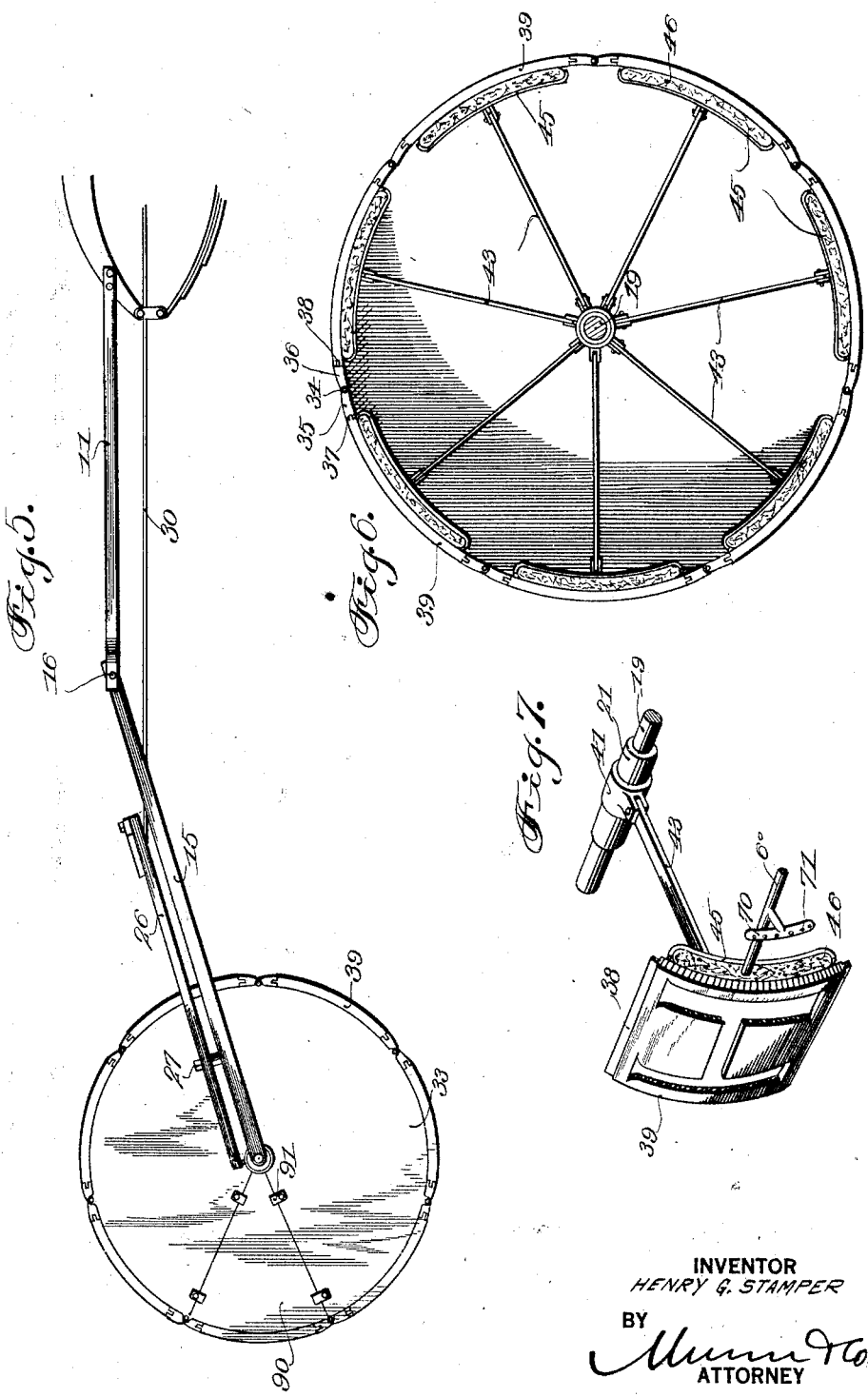

Patented Mar. 26, 1929.

1,707,149

UNITED STATES PATENT OFFICE.

HENRY GRADY STAMPER, OF UNION, MISSISSIPPI.

STAMPING MACHINE.

Application filed November 29, 1927. Serial No. 236,485.

This invention relates to a stamping machine adapted for use in connection with a self propelled vehicle.

An object of the invention is the provision of a stamping machine adapted to be connected to the rear end of a vehicle and having a cylinder in which is included stencils for printing indicia on the highway of such a character and size that it may be readily read by tourists.

A further object of the invention is the provision of a stencilling device in the form of a cylinder, which is adapted to be revolved and drawn over a roadbed for printing indicia in which a plurality of pads are associated with the stencils for supporting the inking fluid which leaves the impression on the roadbed.

A further object of the invention is the provision of a stamping device in the form of a cylinder for connection to the rear end of a vehicle so that the cylinder may be drawn over a roadbed while an inking device mounted within the cylinder revolves therewith for supplying the proper fluid to cause the impression on the roadbed.

This invention will be best understood from a consideration of the following detailed description in connection with the accompanying drawings; nevertheless, it is to be understood that the invention is not confined to the disclosure being susceptible of such changes and modifications as shall define no material departure from the salient features of the invention as defined in the appended claims.

In the drawings:—

Figure 1 is a longitudinal side view of a vehicle equipped with my stamping device, Figure 2 is a plan view of the stamping device shown attached to the rear end of a vehicle, Figure 3 shows the surface of the stamping cylinder, Figure 4 is a longitudinal vertical section of the stamping cylinder showing the mechanism for operating the inking pads, Figure 5 is a side view of the stamping device, Figure 6 is a transverse vertical section of the same, Figure 7 is a perspective of a removable stamper forming part of the stamping cylinder.

Figure 8 is a fragmentary longitudinal section of the supporting axle and actuating sleeves.

Referring more particularly to the drawings 10 designates a vehicle which may be in the form of a passenger automobile or truck, showing my stamping device connected thereto. For the purpose of supporting the stamping device at the rear of the vehicle, a pair of bars 11 and 12 are rigidly secured at 13 to the outwardly projecting ends of the channel beams 14. A bar 15 is pivoted at 16 to the bar 11 and a bar 17 is pivotally connected at 18 to the bar 12. The inner end of the bar 17 is secured to one end of an axle 19, while the bar 15 is removably connected by means of a nut 20, threaded onto the end of the axle. The end of the bar 15 is provided with a passage which receives the threaded end of the axle.

A pair of sleeves 21 and 22 are mounted for rotation on the axle 19 and have their inner ends spaced apart, as shown at 23, to permit the said sleeves to be moved towards each other for a purpose which will be presently described. At the outer end of each sleeve is formed an annular groove 24 each of which receives a yoke 25 at the outer free end of a rod 26 pivoted at 27 on either the bar 15 or 17. The inner ends of the rods 26 are connected to the links 28 which are brought together at 29. The inner ends of the links 28 are connected to a rope or cable 30 and this cable extends forwardly of the vehicle 10 and terminates adjacent the forward end of the car for moving the rope in a direction as indicated by the arrow in Fig. 2, for actuating the links 28 and the rod 26 for the purpose of moving the sleeves 21 and 22 towards each other. A cylinder, generally designated by the numeral 31 has its ends closed by a pair of disks 32 and 33 adjacent the periphery thereof upon which are pivotally mounted narrow plates 35 and 36 extending in opposite directions from the rod 34 and provided along the free edges with grooves 37 adapted to receive a tongue 38 of stencils 39 in the form of curved plates provided with any of the letters of the alphabet or any of the numbers from one to nine, inclusive. By this construction, the various sections of the stencils may be removed and other positioned in order to provide the proper indicia for stamping the roadbed as shown in Fig. 3.

By means of the tongue and groove connection between the various stencils of the plates 35 and 36 said stencils may be slid into place from an end of the cylinder.

Pairs of collars 40 and 41 are secured to each sleeve 21 and 22 and are provided with radially disposed ears 42 to which are pivotally mounted at the inner end thereof links 43. The outer end of each link is pivoted to a pair of ears 44 secured to an elongated container 45 which is spaced from the inner face of the cylinder. Mounted in each container 45 is a pad 46 which is adapted to be supplied with ink or printing fluid in a manner which will be presently explained. As the sleeves 21 and 22 are moved towards each other by the rods 26, the arms 43 will be expanded and force the container and likewise the pads 46 into close contact with the inner face of the stencil, thereby forcing the fluid on the pads through the stencils for application to the highway.

A pump 50 is mounted on a sleeve 51 and is directly coupled with an electric motor 52 also carried by the sleeve. A wire 53 connects the motor with a contact member 54 on the outer face of the end disk 32 which is engaged by a spring contact member 55 rigid with one end of the axle or with the bar 17. A wire 56 connects the contact member 55 with a switch within easy reach of the operator of the car and the switch being in turn connected with the source of current of the vehicle. The motor is grounded so that it is only necessary to employ one wire for the same.

A tank 60 is connected to the pump 50 by means of a pipe 61 for supplying inking fluid to the pump while a pipe 62 connects the pump with a flexible bag 63 which receives the fluid from the pump and acts as a reservoir. The fluid is conducted by the pipe 64 to the second container 65. This container may also be of flexible material. The last mentioned container has a plurality of radially disposed discharge conduits 66 connected by means of flexible couplings 67 with a charging device 68 mounted in the pads.

The charging device consists of an arcuately shaped member 70 having a plurality of perforations 71 through which the fluid is forced for charging the pads 46.

For convenience I have provided approximately seven containers 45 and likewise seven arms 43 connected with each sleeve 40 or 41 for supporting the containers and likewise the pads in close association with the stencils.

A link 80 connects the bar 17 with a lever 81 pivoted at 82 on a bracket 83 connected with the fender 84 of the automobile. An operating handle 85 is located adjacent the front door 86 of the vehicle, whereby the operator of the car may readily grasp the same and release the lever from a locking pin 87 for placing the cylinder 31 in engagement with the roadbed. When the device is not in use, the lever may be positioned as shown in Fig. 1, for maintaining the cylinder elevated above the roadbed.

The operation of my device is as follows:
When it is desired to stencil a roadbed by means of the cylinder or drum 31, the lever 81 is released, permitting the cylinder 31 to come in contact with the roadbed. The motor is set in operation by closing a circuit thereto and liquid from the tank 60 is pumped into the auxiliary container 63, thence into the distributor 65 through pipe 67 to the spraying nozzles 70. The cable 30 is moved in the direction indicated by the arrow for forcing the sleeves 21 and 22 towards each other. By this operation, the arms 43 are expanded, forcing the containers 45 outwardly and pressing the pad 46 against the inner face of the stencil whereby the printing fluid is forced through the openings in the stencil and applied to the roadbed. The pump 50 at this time is in operation and maintains the pads sufficiently saturated with the fluid. The traction of the cylinder on the roadbed causes the cylinder to revolve and likewise the parts associated therewith.

A V-shaped door 90 is formed in each end disk 32 or 33 and is held in place by means of clips 91. This door permits inspection and a passage whereby a mechanic may repair parts when necessary.

I claim:—

1. A device of the character described comprising a cylinder mounted for rotation and formed of a plurality of removably mounted stencils, means for removably supporting the stencils, and means for supplying ink to the rear faces of the stencils.

2. A device of the character described comprising a cylinder mounted for rotation and formed of a plurality of removably mounted stencils, means for removably supporting the stencils, an axle for supporting the cylinder, pads associated with the stencils, and means for pumping ink to the pads.

3. A device of the character described comprising a cylinder mounted for rotation and formed of a plurality of removably mounted stencils, means for removably supporting the stencils, and axle for supporting the cylinder, pads associated with the stencils, and means supported by the axle for pumping ink to the pads.

4. A device of the character described comprising a cylinder mounted for rotation and formed of a plurality of removably mounted stencils, means for removably supporting the stencils, an axle for supporting the cylinder, pads associated with the stencils, a tank for ink supported on the axle, a pump connected with the tank, and means connected with the pump for conducting ink to the pads.

5. A device of the character described comprising a cylinder mounted for rotation and formed of a plurality of removably mounted stencils, means for removably supporting the stencils, an axle for supporting the cylinder, pads associated with the stencils, means for supplying ink to the pads, and means for forcing the pads against the stencils.

6. A device of the character described comprising a cylinder mounted for rotation and formed of a plurality of removably mounted stencils, means for removably supporting the stencils, an axle for supporting the cylinder, pads associated with the stencils, sleeves slidably mounted on the axle, arms having pivotal connection with the sleeve and the pads, and means for reciprocating the sleeve to cause the pads to be forced into inking engagement with the stencils.

7. A device of the character described comprising a cylinder mounted for rotation and formed of a plurality of removably mounted stencils, means for removably supporting the stencils, an axle for supporting the cylinder, pads associated with the stencils, sleeves slidably mounted on the axle, arms having pivotal connection with the sleeves and the pads, means for reciprocating the sleeves to cause the pads to be forced into inking engagement with the stencils, pivotally mounted levers, means for oscillating said levers, said levers having operative connections with the sleeves for causing reciprocation of said sleeves.

8. A device of the character described comprising a cylinder mounted for rotation and formed of a plurality of removably mounted stencils, means for removably supporting the stencils, disks for closing the ends of the cylinders, and a door in each disk.

Signed at Union, in the county of Newton and State of Mississippi this 25th day of November, A. D. nineteen hundred and twenty seven.

HENRY GRADY STAMPER.